United States Patent [19]

White

[11] 3,873,055

[45] Mar. 25, 1975

[54] DAMPING AND GUIDANCE SYSTEMS

[75] Inventor: Harold William White, Coventry, England

[73] Assignee: Dunlop Limited, London, England

[22] Filed: Aug. 8, 1973

[21] Appl. No.: 386,632

[30] Foreign Application Priority Data

Aug. 12, 1972 United Kingdom............... 37732/72
Dec. 1, 1972 United Kingdom............... 55493/72

[52] U.S. Cl.................... 248/399, 188/1 B, 297/308
[51] Int. Cl.............................................. B60n 1/02
[58] Field of Search............ 248/399, 358 R, 15, 16, 248/18, 20, 21, 22; 188/1 B, 129; 297/216, 307, 308; 267/9 C; 308/6 R

[56] References Cited
UNITED STATES PATENTS

| | | | |
|---|---|---|---|
| 1,424,783 | 8/1922 | Snaman............................. | 267/9 C |
| 1,926,828 | 9/1933 | Berkel............................... | 306/6 R |
| 3,552,795 | 1/1971 | Perkins et al...................... | 297/216 |
| 3,583,530 | 6/1971 | De Venne......................... | 188/1 |
| 3,661,176 | 5/1972 | Lowe................................ | 137/560 |

FOREIGN PATENTS OR APPLICATIONS 1,507,267 12/1967 France

803,454 2/1951 Germany............................ 188/129

*Primary Examiner*—Roy D. Frazier
*Assistant Examiner*—Robert W. Gibson, Jr.
*Attorney, Agent, or Firm*—Stevens, Davis, Miller & Mosher

[57] ABSTRACT

A damping and guidance system for controlling the relative position and movement of two components comprising a guidance channel arranged to be operatively associated with one component and a locating member arranged to be operatively associated with the other component. The locating member being arranged to project into the channel, the channel and the locating member being constrained to allow relative movement therebetween only in a direction substantially parallel to the longitudinal axis of the channel. At least one side of the channel having a lining of deformable elastomeric material into which the locating member is preloaded into contact so that relative movement of the member along the channel is damped by the internal hysteresis of the material, of which the following is a specification.

5 Claims, 22 Drawing Figures

DAMPING AND GUIDANCE SYSTEMS

This invention relates to damping and guidance systems for controlling the relative position and movement of two components and particularly, though not exclusively, to such systems for use with seat arrangements incorporating a vibration damping mounting such as for example a the tractor seat arrangement as described in the commonly assigned co-pending U.S. Pat. application Ser. No. 331,118.

As discussed in the above co-pending application there is a tendency for tractor manufacturers to replace the crude unsprung traditional tractor seat with a spring seat which provides much improved confort and safety for the driver. This tendency has been reinforced by legislation in certain countries laying down performance requirements with which the seats fitted to tractors currently sold in these countries must comply.

It is an object of the present invention to provide a damping and guidance system which is capable of damping and guiding the vertical oscillations of a tractor seat of the kind disclosed in the previously referred to co-pending U.S. patent application.

According to the present invention a damping and guidance system for controlling the relative position and movement of two components comprises a guidance channel arranged to be operatively associated with one component and a locating member arranged to be operatively associated with the other component and arranged to project into the channel, the channel and locating member being constrained to allow relative movement therebetween only in a direction substantially parallel to the longitudinal axis of the channel, at least one side of the channel having a lining of deformable elastomeric material and the locating member being pre-loaded into contact with the elastomeric material so that relative movement of the member along the channel is damped by the internal hysteresis of the material.

Several embodiments of the present invention will now be described by way of example only with reference to the accompanying drawings in which.

Figure 1:
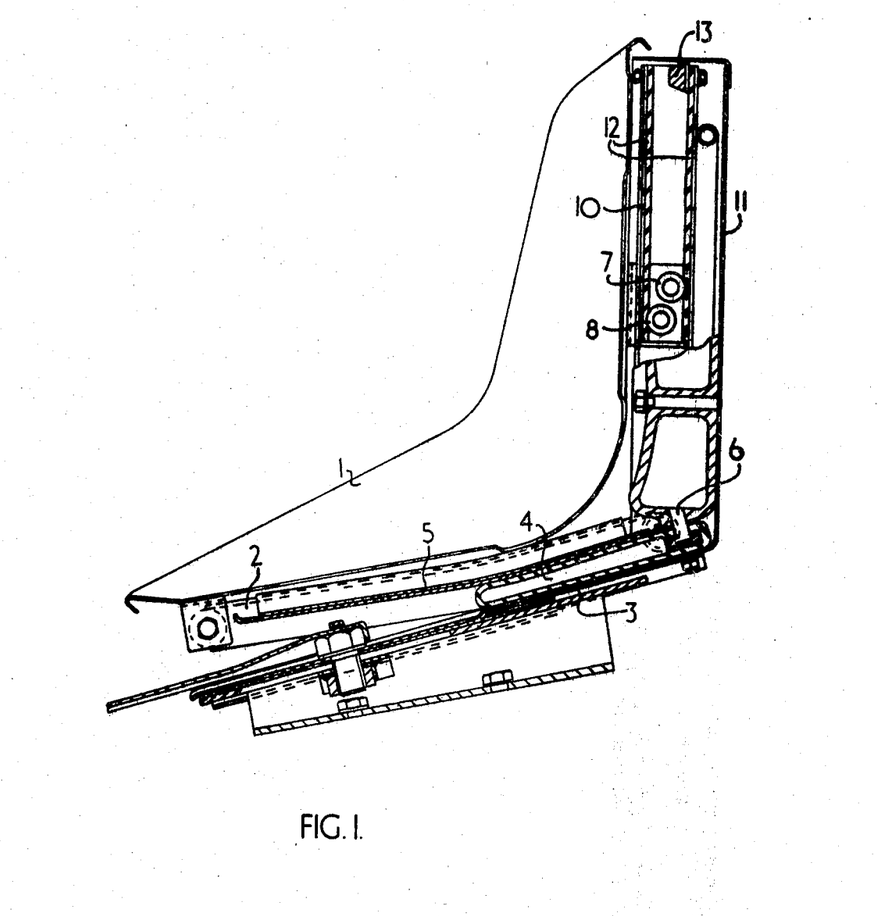
FIG. 1 is a sectional view of a tractor seat assembly in accordance with the present invention.

A tractor seat arrangement employing a pneumatic variable rate spring mounting and a damping and guidance system in accordance with the present invention is shown in FIG. 1.

The seat arrangement is substantially identical to that described in the previously referred to co-pending application and will not therefore be described in detail. Essentially the seat arrangement comprises a seat 1 which is secured to the tractor by a mounting comprising a U-shaped bar 2 which extends through two brackets secured under the front of the seat and is pivotally secured at its free ends to a steel plate 3. A variable rate pneumatic spring, in the form of a pouch 4, is arranged to act between the plate 3 and a plate 5 which is secured to and extends between the two arms of the U-shaped bracket.

The pouch is provided with an inlet pipe 6 through which air can be admitted or expelled from the pouch.

In the arrangement shown in FIG. 1 vertical movement of the seat results in rotation of bar 2 relative to plate 3. The vertical movement of the seat is guided by two pairs of rotatable nylon rollers 7, 8, shown in more detail in FIGS. 2 and 3, which are secured to the back of the seat by a bracket 9 positioned on each side of the seat, and arranged to extend across the back of the seat. Each pair of rollers projects into and engages a guidance channel 10 provided on a support frame 11 mounted on plate 3.

Figure 2:
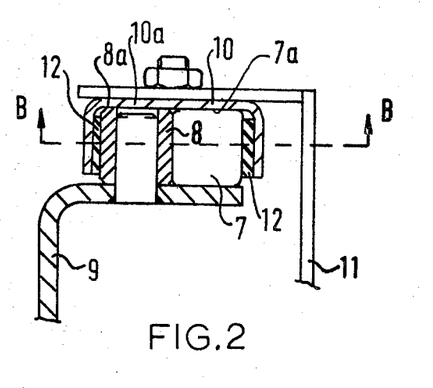
FIG. 2 is a sectional view on the line A—A of FIG. 3 of a damping and guidance system suitable for use in the seat assembly shown in FIG. 1.
Figure 3:
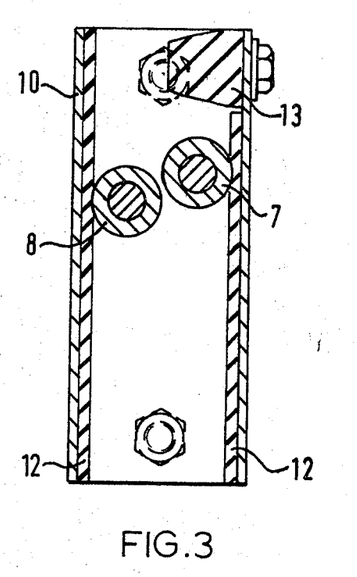
FIG. 3 is a sectional view on the line B—B of of FIG. 2.

The sides of each guidance channel are lined with a high hysteresis rubber lining 12 and the rollers are pre-loaded into the rubber lining so that vertical movements of the seat which result in the movement of each pair of rollers along their associated channel are damped by the internal hysteresis of the lining material. Upward movement of the roller in each channel is limited by a rubber rebound stop 13 bolted to the wall of the channel.

Downward movement of the seat relative to plate 3 compresses pouch 4 which resists such compression, being pressurised by air initially supplied by a hand operated pump (not shown). Lateral movement of the rollers is resisted by the end faces 7a, 8a of the rollers 7, 8 acting against the base 10a of each guidance channel, the bracket 9 serving to hold the rollers in a spaced apart relationship.

In the arrangement shown in FIGS. 1 to 3 the rear roller 8 of each pair is the main load carrier and thus the contact pressure of this roller varies depending on the weight of the tractor driver and the position of the seat, whereas the contact pressure of roller 7 remains substantially constant. If desired in order to obtain more uniform damping the rubber lining can be omitted on the side of each channel contacted by the load-carrying roller 8, and roller 8 can be arranged to directly contact the channel. With this arrangement the non-load-carrying rollers 7 exert a substantially constant contact pressure on the associated rubber lining and thus more uniform damping is achieved.

Figure 4:
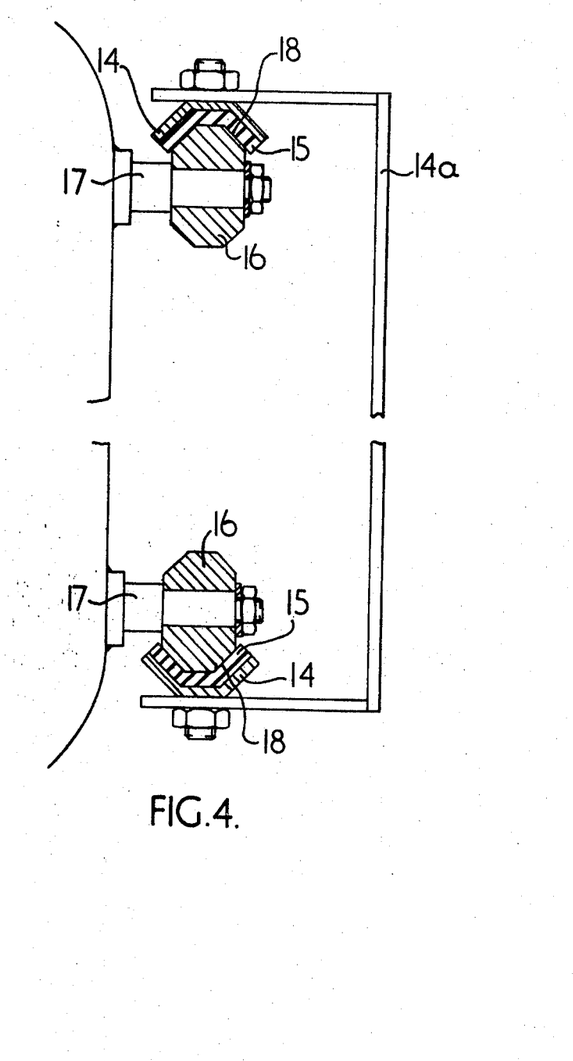
FIG. 4 is a sectional view on a horizontal plane of an alternative form of damping and guidance system.

In a modified form of damping and guidance system shown in FIG. 4 the sides of the guidance channels 14 are inclined outwardly and the entire channel is lined with a high hysteresis rubber lining 15.

The seat is provided with two rotatable nylon rollers 16, one at each side, which are mounted on shafts 17 which are welded or otherwise secured to the rear of the seat. The above location ensures that the rollers 16 are laterally located within the guidance channels. The cross-section of each roller is arranged to correspond with the cross-section of the associated guidance channel so that relative movement between the rollers and the channels is again damped by internal hysteresis.

As with the arrangement shown in FIGS. 1 to 3, the arrangement shown in FIG. 4 can be modified if desired so that the load-carrying faces 18 of the rollers can be arranged to directly contact the channel thereby reducing the previously discussed variations in damping produced by variations in roller contact pressure.

Figure 5:
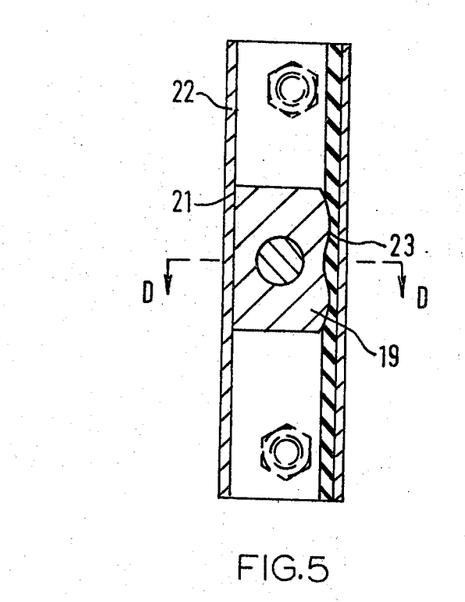
FIG. 5 is a sectional view on the line C—C of FIG. 6 of a further alternative form of damping and guidance system.
Figure 6:
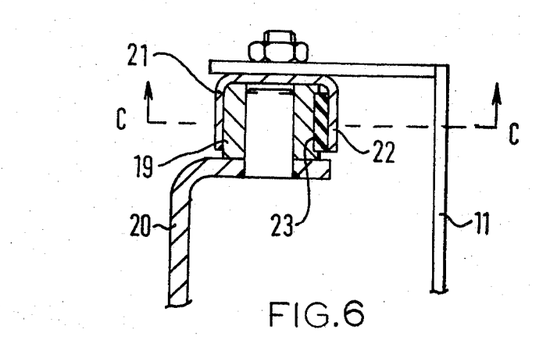
FIG. 6 is a sectional view on the line D—D of FIG. 5.

In a still further form of damping and guidance system shown in FIGS. 5 and 6 the rollers employed in the previously described constructions are replaced by a pair of pivoted nylon blocks 19 secured one on each side of the rear of the seat by brackets 20. The load-carrying face 21 of each block is flat and is arranged to directly contact one side of its associated guidance channel 22, while the other face 23 of each block is wave-shaped in form and is pre-loaded into contact with a high hysteresis rubber liner bonded to the side of the associated channel. The arrangement shown in FIG. 4 thus eliminates variations in damping due to variations in contact pressure by arranging that only the non-load-carrying faces of the blocks engage the rubber liner.

The wave-shaped form of the faces of the blocks which contact the rubber liners assists in promoting ripples in the surface of the liners as the blocks slide up and down the guidance channels. This promotion of surface ripples is a feature of all the damping and guidance systems described above and it is as a result of continuously compressing and releasing the rubber liners by the passage of the rollers or blocks up and down the guidance channels that the damping effect is achieved. The damping effect results because, as a result of the internal hysteresis loss within the linear, the restoring force exerted on the rollers or blocks as a result of a given deflection of the linears is smaller than the force which the rollers or blocks must exert on the liners in order to achieve that deflection.

Figure 7:
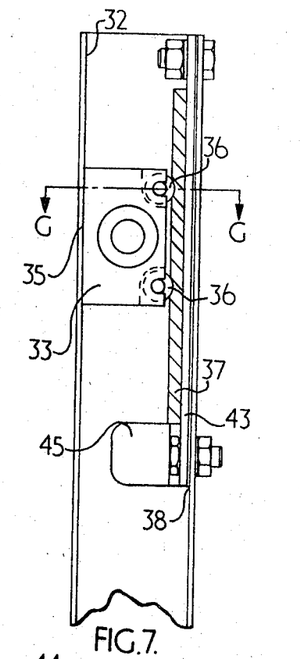
FIG. 7 is a side-on sectional view of a still further alternative form of damping and guidance system.
Figure 8:
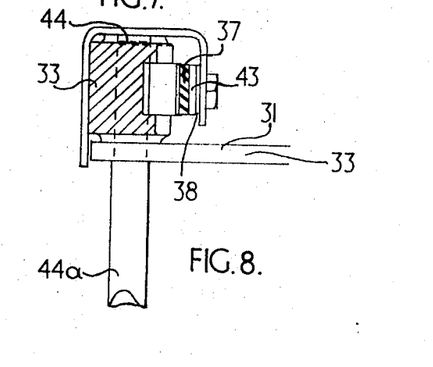
FIG. 8 is a sectional view on the line G—G of FIG. 7.

In a still further embodiment as shown in FIGS. 7 and 8 of the accompanying drawings, vertical movement of a tractor seat attachment bracket 32, bolted to a tractor seat (not shown) is controlled by a damping and guidance system comprising two guidance channels 32 disposed one on each side of the seat and supported on a frame secured to the tractor. A pair of pivoted nylon blocks 33 are secured one on each side of the seat by attachment backets 31, one block being arranged to project into and engage each guidance channel.

The rear load-carrying face 35 of each block is flat and is arranged to directly contact one side of the associated guidance channel. The front face of each block carries two rollers 36 which engage a high hysteresis rubber liner 37 bonded to a backing plate 43 which is secured to the adjacent side of the guidance channel.

Each block is also provided with a side pad in the form of a projecting boss 44 which is arranged to make sliding contact with the base of each guidance channel. A cross member 44a is located through the centre of each block and arranged to extend across the base of the seat to render with the side pads of the two blocks lateral control of the vertical movement of the associated seat.

A rubber stop 45 may be provided at either end of each rubber liner in order to limit the movement of the associated block within the guidance channel.

The damping effect can be varied by adjusting the number and diameter of the rollers, and by adding shims 38 between the backing plate 43 and channel 32, thus increasing the contact pressure between rollers and the liner.

Figure 9:
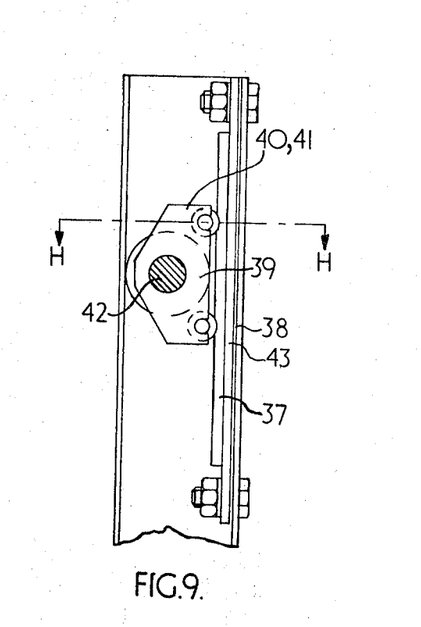
FIG. 9 is a side-on view of a still further alternative form of damping and guidance system.
Figure 10:
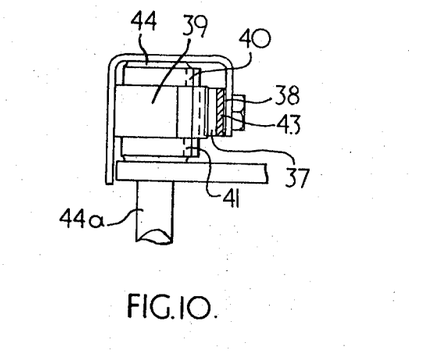
FIG. 10 is a sectional view on the line H—H of FIG. 9.

The sliding block incorporating insert rollers, as shown in FIGS. 7 and 8, can be modified, as shown in FIGS. 9 and 10, by incorporating an additional larger roller 39 to transmit the load from the seat to the guidance channel, replacing the sliding face contact between the block and the guidance channel used in the arrangement shown in FIGS. 1 and 2. The incorporation of the additional roller eliminates any tendency for the block and stick in the guidance channel which might arise with the face contact employed in the alternative arrangement shown in FIGS. 1 and 2. When employing the arrangement shown in FIGS. 9 and 10, the rollers are supported between two separate block side pieces 40 and 41 which are held together by a pin 42 on which the larger roller 39 is mounted.

Figure 11:
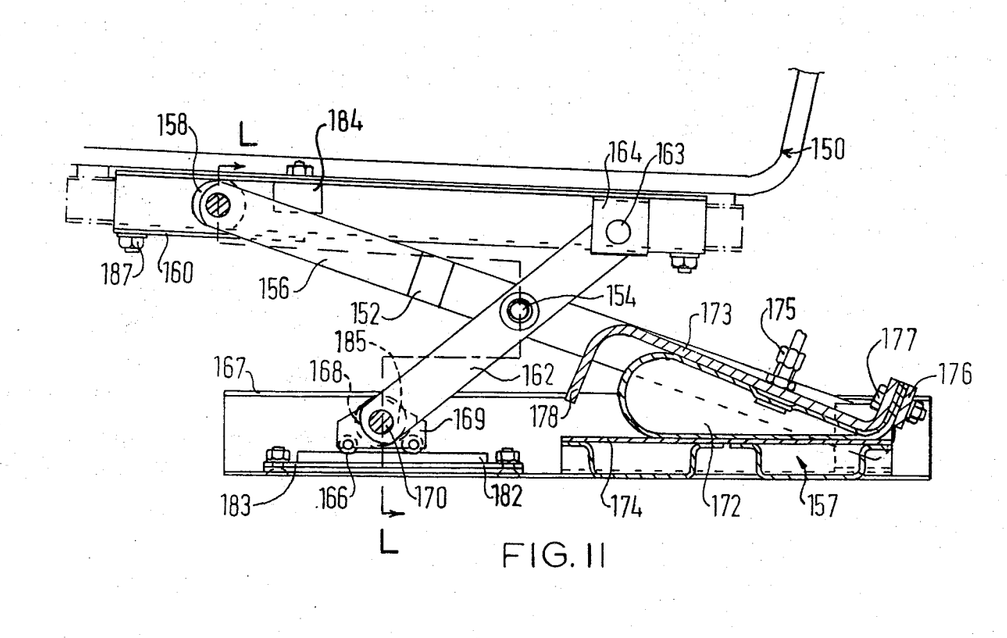
FIG. 11 is a longitudinal section through a further form of seat assembly in accordance with the present invention.
Figure 12:
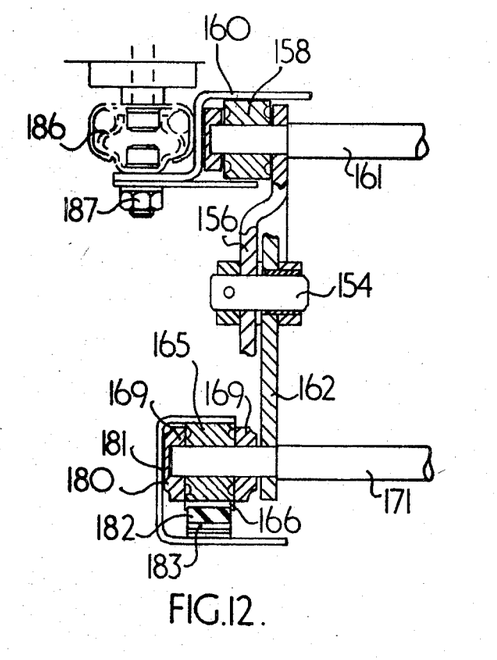
FIG. 12 is a sectional view on the line L—L of FIG. 11.
Figure 13:
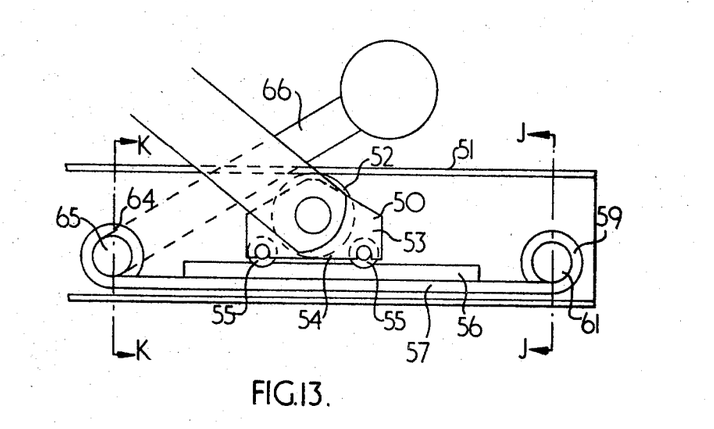
FIG. 13 is a side-on view of a still further alternative form of damping and guidance system.
Figure 14:
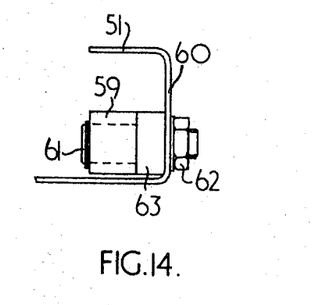
FIG. 14 is a sectional view on the line J—J of FIG. 13.

FIGS. 11 and 12 of the accompanying drawings show a further form of seat assembly in accordance with the present invention in which a seat 150 is mounted on two pairs of scissor levers 152 disposed one on each side of the seat. The levers of each pair are of unequal length and are interconnected by pivot pins 154.

The longer lever 156 of each pair is connected at one end by a pin 159 to a frame 157 which is secured to the vehicle. The other end of each lever 156 is connected to a roller 158 which is located within one or two substantially horizontal upper guidance channels 160 positioned one on each side of the seat. The guidance channels are secured to the under-side of the seat by bolt 187 which also extend through horizontal adjustment devices 186. The two rollers 158 are rotatably mounted on a tie-rod 161 which extends through the levers 156.

The other lever 162 of each pair is connected at one end by a pin 163 to a bracket 169 secured to the under-side of the seat by a bolt 188 which also extends through a horizontal adjustment device 189. The other end of each lever 162 is connected to a system of rollers 165, 166 similar to those shown in FIGS. 9 and 10 which engages one of two substantially horizontal lower guidance channels 167 which form part of frame 157 and which extend one at each side of the seat.

Each roller system comprises a larger diameter load-taking roller 165 and two smaller diameter damping rollers 166 all carried in a two-piece nylon or plastics block 168. The two halves 169 of each block 168 are held together by a tie-rod 171 which extends between the block and on which the load-taking rollers are mounted.

The outer half of each block 168 is again provided with a boss 180 which is arranged to make sliding contact with the base 181 of each guidance channel so that the two blocks 168 together provide lateral control of the vertical movement of the seat.

Each load-taking roller 165 directly contacts the guidance channel and the damping rollers 166 are preloaded into contact with a strip 182 of rubber which is bonded to a backing plate 183. The backing plate is in turn bolted to the non-load-taking side of each channel.

The seat is again supported on a variable rate spring in the form of a textile reinforced pouch 172 which is arranged to act between a plate 173 secured to longer levers 156 and a plate 174 forming part of frame 157. The pouch, which is provided with a single pipe 175 for admitting air to and exhausting air from its interior, is clamped between a clamping plate 176 and plate 173 by a series of nuts and bolts 177.

Vertical movement of the seat, which results in the horizontal displacement of blocks 168, is damped as a result of the internal hysteresis losses within the rubber strips caused by the continuous compressing and releasing of the rubber liners by the damping rollers 166 carried by each block. A rubber stop 184 is provided in the upper guidance channels 160 to limit the vertically upward movement of the seat.

By arranging the levers 162 to be shorter than levers 156 and to operate at a greater angle to the horizontal than levers 156, the angular movement of levers 162 resulting from a given vertical displacement of the seat is increased. This in turn increases the movement of the blocks 168 within the lower guidance channels thus increasing the damping force applied to the seat for a given vertical displacement.

Both arrangements described above are suitable for use with substantially vertical or horizontally disposed guidance channels or guidance channels inclined at any other desired angle.

In a further construction as shown in FIGS. 13 to 16 the damping characteristic of the damper is varied by providing means for adjusting the position of the rubber lining.

A pair of pivoted nylon blocks 50 of the kind described in relation to the previous embodiment are secured one on each side of the seat by attachment brackets, one block being arranged to project into and engage each guidance channel 51. The load-carrying face of each block is provided with larger rollers 52 supported between nylon or plastics side plates 53 as described in relation to the previous embodiment and arranged to transmit the load from the seat to the guidance channel 51.

The face 54 of each block 50 carries two rollers which engage a high hysteresis rubber liner 56 bonded to a backing plate 57. One end of the backing plate 57 is pivotally mounted to the guidance channel 51 by securing a rolled cylindrical mounting flange 59 to the operating face 60 of the channel 51 by means of a stud 61 and nut 62 with a spacer 63 positioned therebetween.

Figure 15:
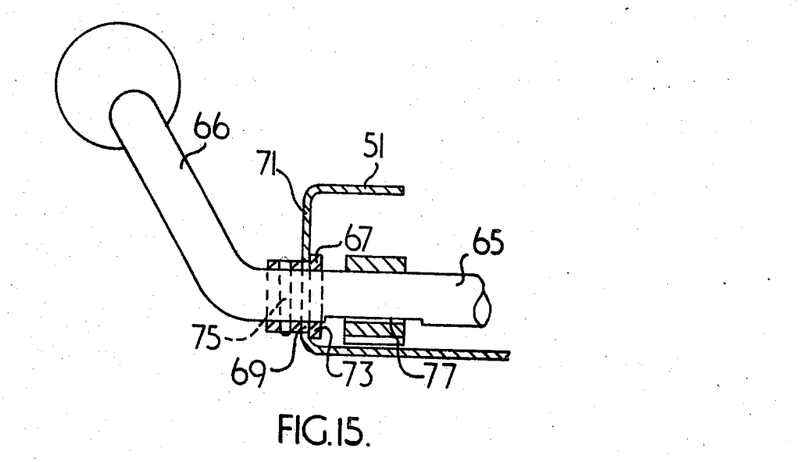
FIG. 15 is a sectional view on the line K—K of FIG. 13.
Figure 16:
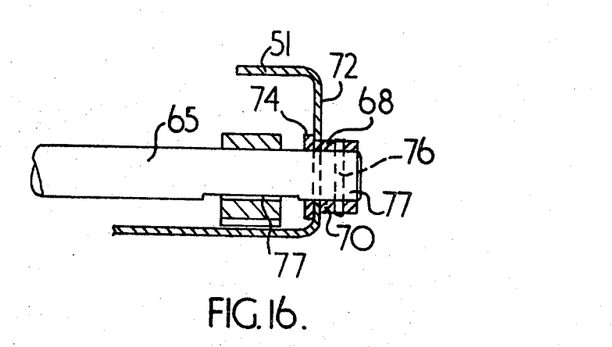
FIG. 16 is a sectional view similar to FIG. 15 of an opposite channel.

The other end of the backing plate is provided with a similar roller cylindrical mounting flange 64 which supports a cylindrical bar 65 which extends across the base of the seat through the walls of both guidance channels 51. One end of the bar 65 as shown in FIG. 15 is curved to define a manually operable lever 66. The bar 65 is secured to each guidance channel 51 by means of plastic bushes 67 and 68 which locate within apertures 69 and 70 provided in the end walls 71 and 72 of the guidance channels 51. Each bush is provided with an enlarged shoulder 73, 74 which abuts the inboard face of the end wall 71 and 72. A tapered pin 75, 76 is pressed into a drilling which extends radially through the bush 67, 68 and bar 65 thereby preventing the bar from being axially displaced from the guidance channel 51.

A portion 77 of the circumference of the bar 65 in the area where the bar passes through the rolled cylindrical flange 64 of each backing plate 57 is relieved to provide a cam surface 77 such that on rotation of the bar 65 by means of the lever 66 the backing plate 57 is angularly displaced about the pivoted end thereby causing either a divergence or a convergence of the channel along which the nylon block 50 is displaced. Convergence of the channel causes and increase in the damping effect whilst divergence of the channel has the converse effect.

In a further embodiment shown in FIGS. 17 to 20 the damping characteristic of the damper is varied by varying the load transmitted from the seat to the guidance channel.

Figure 17:
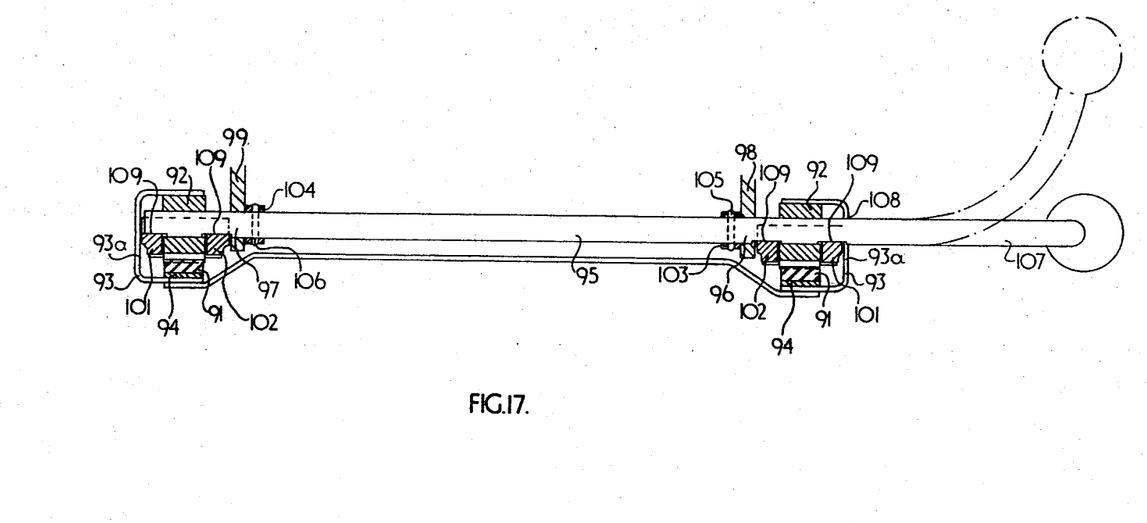
FIG. 17 is an end-on sectional view of a still further alternative form of damping and guidance system.

A sliding block 90 (of the kind shown in FIG. 9) incorporating inset rollers 91 and utilising an additional larger rollers 92 to transmit the load from the seat to the guidance channel 93 is provided with means to vary the load exerted onto the rubber liner 94 by the two smaller rollers 91. As shown in FIG. 17 the sliding blocks in each guidance channel are interconnected by a cylindrical cross-bar 95 which extends through apertures 96 and 97 provided within mounting flanges 98 and 99 which extend from the seat (not shown).

Figure 18:
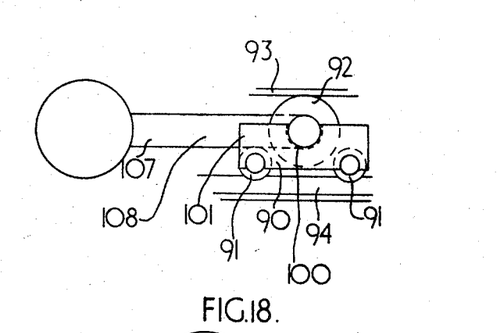
FIGS. 18, 19 and 20 are side-on views of the damping and guidance system of FIG. 17 shown in various positions of adjustment.
Figure 19:
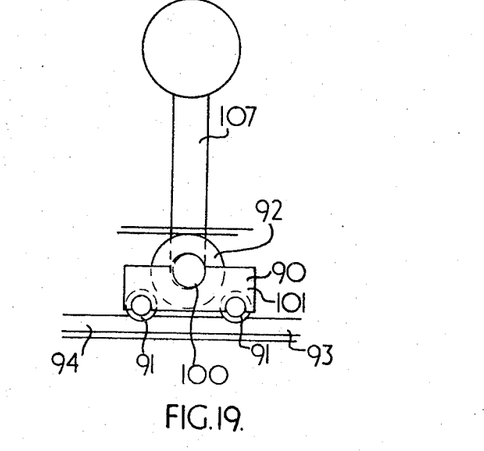
Figure 20:
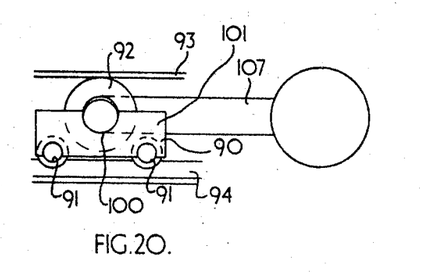

The cross-bar 95 extends through the centre of each roller 92 and is supported by semi-circular cut outs 100 formed in the nylon or plastics side plates 101, 102 (as shown in FIGS. 18–20).

The side plates 101, 102 act with the cross-bar 95 against the outboard sides 93a of the guidance channels to laterally locate the rollers within the guidance channels.

The cross-bar 95 is prevented from axial displacement by means of plastics washers 103, 104 which are secured to the periphery of the bar by radially extending pins 105, 106 and which abut against the inboard side of each mounting flange 98, 99. One end of the cross-bar is provided with a curved end which forms a manually operable lever 107 which is arranged to extend through a slot 108 which extends axially along the side of outboard side 93a one of the guidance channels 93. The slot is provided to ensure that the lever does not impede the axial movement of the blocks along the channel. The portion of the cross-bar which extends through each side plate 101, 102 is relieved to provide a cam surface 109 such that upon rotation of the bar 95 by means of the lever 107 the side plates 101, 102 are perpendicularly displaced relative to the axis of the guidance channel 93. When the side plates are displaced towards the base of the carriage, the load transmitted by the small rollers 91 is increased thereby increasing the damping produced by the rubber liner 94. By varying the position of the lever 107, as shown in FIGS. 17 to 20, the damping force can be varied from a maximum to a minimum level.

By providing a means for adjusting the damping of the seat, the seat may be satisfactorily used in many applications. When fitted to a vehicle for use on variable surfaces the damping characteristics may be varied until a damping which affords the optimum comfort is achieved. If desirable its damping characteristics may be adjusted to a maximum until eventually the seat becomes locked.

It will be evident to those skilled in the art that the damping characteristics of the above systems can also be varied by adjusting the mix of the rubber from which the liners are produced as an alternative to adjusting the pre-loading and/or contact pressure between the rollers or blocks and the liners. In a further example, the damping characteristics of the systems can be arranged to vary by varying the area of contact between the rollers and rubber, as shown in FIGS. 21 and 22.

Figure 21:
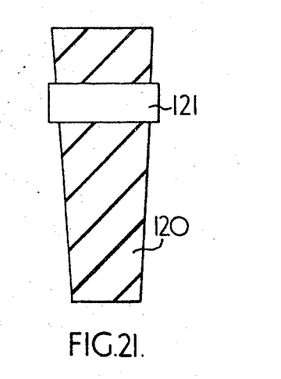
FIGS. 21 and 22 are schematic plan and side views of another form of damping and guidance system in which the damping characteristics are arranged to vary with deflection.

FIG. 21 shows a rubber liner 120 in plan view with the cross-sectional area changing along the length of the liner, thereby varying the area of contact between a roller 121 and the rubber liner 120 and hence the damping characteristic.

Figure 22:
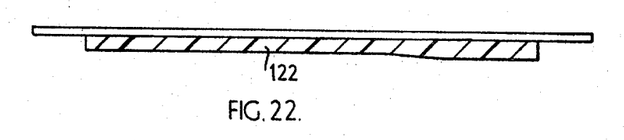

FIG. 22 shows an alternative method for adjusting the pre-loading contact pressure by providing a liner 122 which increases in thickness along part of its length.

Further, although in all the constructions described above the lining material has been stated as being rubber, lining material.

Having now described my invention, what I claim is:

1. A damping and guidance system for controlling the relative position and movement of two components comprising two or more guidance channels, each channel being arranged to be operatively associated with one component and one of two interconnecting locating members arranged to be operatively associated with the other component and arranged to project one into each channel respectively, the channels and locating members being arranged to allow relative movement therebetween only in a direction substantially parallel to the longitudinal axis of the channels, one side of each channel having a lining of deformable elastomeric material and the respective locating member being preloaded into contact with the elastomeric material so that relative movement of each member along its respective channel is damped by the internal hysteresis of the material, each locating member comprising a block, at least two rollers on one face of said block, said rollers being preloaded into rolling contact with the lining of elastomeric material secured to one side of the associated channel.

2. A damping and guidance system according to claim 1 wherein another face of each block is arranged to make direct sliding contact with the other side of the associated guidance channel.

3. A damping and guidance system according to claim 1 further comprising:
a third roller on the face of said block opposite said one face, said third roller being arranged to make direct rolling contact with the other side of the associated guidance channel.

4. A damping and guidance system accordance to claim 3 wherein means is provided to vary the position of each block which supports the third roller with respect to the other two rollers thereby varying the load transmitted by the other two rollers to the lining of elastomeric material.

5. A damping and guidance system according to claim 4 wherein the means comprises a bar having at least one portion relieved to provide a cam surface, said bar being arranged to extend through the centre of the third roller and the block such that on rotation of the bar the position of the block relative to the longitudinal axis of the channel is varied.

* * * * *